United States Patent
Yoshida et al.

(10) Patent No.: US 11,628,637 B2
(45) Date of Patent: Apr. 18, 2023

(54) HOT PRESS CUSHIONING MATERIAL

(71) Applicant: YAMAUCHI CORP., Hirakata (JP)

(72) Inventors: Akira Yoshida, Tochigi (JP); Shuhei Kouno, Tochigi (JP)

(73) Assignee: YAMAUCHI CORP., Hirakata (JP)

( * ) Notice: Subject to any disclaimer, the term of this patent is extended or adjusted under 35 U.S.C. 154(b) by 0 days.

(21) Appl. No.: 17/281,469

(22) PCT Filed: Sep. 30, 2019

(86) PCT No.: PCT/JP2019/038541
§ 371 (c)(1),
(2) Date: Mar. 30, 2021

(87) PCT Pub. No.: WO2020/075556
PCT Pub. Date: Apr. 16, 2020

(65) Prior Publication Data
US 2021/0402725 A1    Dec. 30, 2021

(30) Foreign Application Priority Data

Oct. 9, 2018 (JP) .............................. JP2018-190649

(51) Int. Cl.
*B29C 70/50* (2006.01)
*B29C 43/36* (2006.01)
(Continued)

(52) U.S. Cl.
CPC ........ *B29C 70/504* (2013.01); *B29C 43/3642* (2013.01); *B29C 70/30* (2013.01);
(Continued)

(58) Field of Classification Search
CPC ... B29C 70/504; B29C 43/3642; B29C 70/30; B29C 2043/3655; B32B 2307/306;
(Continued)

(56) References Cited

U.S. PATENT DOCUMENTS

2017/0129206 A1* 5/2017 Yoshida ............... B32B 5/08

FOREIGN PATENT DOCUMENTS

| CN | 1942298 A | 4/2007 |
|---|---|---|
| CN | 1980780 A | 6/2007 |

(Continued)

OTHER PUBLICATIONS

Machine translation of JP-2003211472 A; Published on Jul. 29, 2003.*

(Continued)

*Primary Examiner* — Vishal I Patel
(74) *Attorney, Agent, or Firm* — Hauptman Ham, LLP

(57) ABSTRACT

A hot press cushioning material includes a cushioning material body in the form of a plate; and surface materials provided on the front and back sides of the cushioning material body. The surface material includes a core layer composed of a heat resistant fiber material for a nonwoven structure, and a front-side resin layer covering the entire front side of the core layer. The core layer has an air permeability of 5 $cm^3 \cdot cm^{-2} \cdot s^{-1}$ or less and a bulk density of 0.8 $g/cm^3$ or more.

10 Claims, 8 Drawing Sheets

(51) Int. Cl.
  *B30B 15/06*  (2006.01)
  *B32B 25/08*  (2006.01)
  *B32B 25/10*  (2006.01)
  *B29C 70/30*  (2006.01)

(52) U.S. Cl.
  CPC ............ *B30B 15/061* (2013.01); *B32B 25/08* (2013.01); *B32B 25/10* (2013.01); *B29C 2043/3655* (2013.01); *B29K 2995/0016* (2013.01); *B32B 2307/306* (2013.01)

(58) Field of Classification Search
  CPC . B32B 25/10; B32B 25/08; B29K 2995/0016; B30B 15/061
  See application file for complete search history.

(56) References Cited

FOREIGN PATENT DOCUMENTS

| | | | |
|---|---|---|---|
| CN | 103946433 A | 7/2014 | |
| EP | 1462233 A1 | 9/2004 | |
| EP | 1839833 A1 * | 10/2007 | ............. B29C 43/18 |
| EP | 1839833 A1 | 10/2007 | |
| EP | 2865518 A1 | 4/2015 | |
| EP | 3162527 A1 | 5/2017 | |
| EP | 2719513 B1 | 8/2017 | |
| JP | H08-90577 A | 4/1996 | |
| JP | 2003-211472 A | 7/2003 | |
| JP | 2004-344962 A | 12/2004 | |
| JP | 2011-116034 A | 6/2011 | |
| JP | 2013-132889 A | 7/2013 | |
| JP | 2014-087999 A | 5/2014 | |
| JP | 2016-010945 A | 1/2016 | |
| JP | 2016-168845 A | 9/2016 | |
| JP | 2017-185706 A | 10/2017 | |
| TW | 201249645 A | 12/2012 | |
| TW | 201902674 A | 1/2019 | |
| WO | 2016/060240 A1 | 4/2016 | |

OTHER PUBLICATIONS

European Search Report issued in corresponding European Application No. 19872130.0, dated May 27, 2022, pp. 1-10, European Patent Office, Munich, Germany.

International Search Report issued in corresponding International Application No. PCT/JP2019/038541, dated Nov. 26, 2019, pp. 1-2, Japan Patent Office, Tokyo, Japan.

* cited by examiner (a) EXAMPLE 1 OF PRESENT INVENTION (b) EXAMPLE 2 OF PRESENT INVENTION (c) COMPARATIVE EXAMPLE 1

(d) COMPARATIVE EXAMPLE 2

(e) COMPARATIVE EXAMPLE 3

(f) COMPARATIVE EXAMPLE 4

(g) COMPARATIVE EXAMPLE 5

(a) EXAMPLE 1 OF PRESENT INVENTION (b) EXAMPLE 2 OF PRESENT INVENTION (c) COMPARATIVE EXAMPLE 1

(d) COMPARATIVE EXAMPLE 2

(e) COMPARATIVE EXAMPLE 3

(f) COMPARATIVE EXAMPLE 4

(g) COMPARATIVE EXAMPLE 5

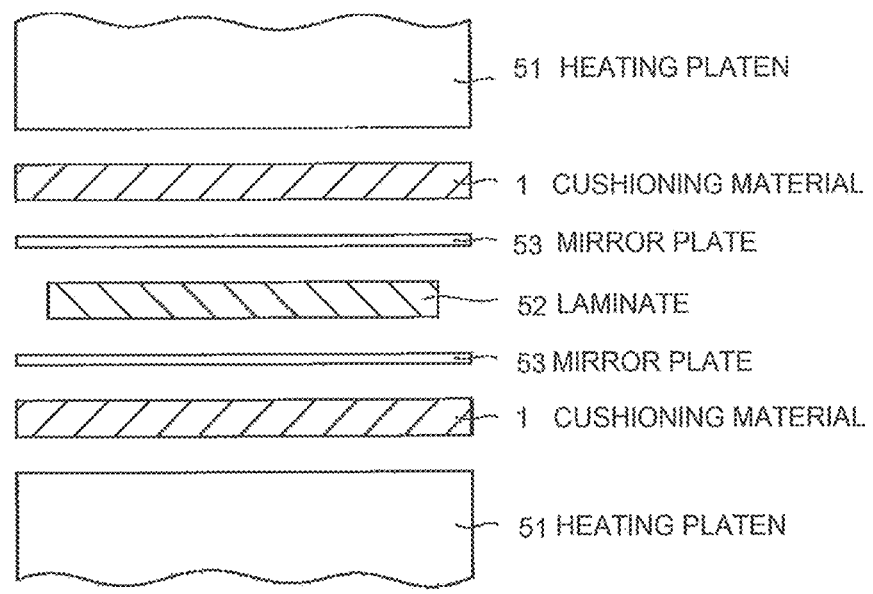

HOT PRESS CUSHIONING MATERIAL

CROSS-REFERENCE TO RELATED APPLICATIONS

The present application is a National Phase of International Application Number PCT/JP2019/038541, filed Sep. 30, 2019, which claims priority to Japanese Patent Application No. 2018-190649, filed Oct. 9, 2018, both which are hereby incorporated by reference in their entirety.

TECHNICAL FIELD

The present invention relates to hot press cushioning materials. More particularly, the present invention relates to a hot press cushioning material that is used when press forming or thermocompression bonding an intended product in the process of manufacturing a precision equipment component (hereinafter referred to as a "laminate" in the present invention) such as a printed circuit board like a copper clad laminate, a flexible printed circuit board, or a multilayer board, an IC card, a liquid crystal display panel, or a ceramic laminate, and a manufacturing method of the hot press cushioning material.

BACKGROUND ART

As shown in FIG. 16, when manufacturing a laminate such as a printed circuit board, a laminate 52 that is an object to be pressed is placed between heating platens 51 that are heating and pressing means and a certain pressure and heat are applied to the laminate 52 in a press forming or thermocompression bonding process. In order to produce an accurate formed product, it is necessary to uniformly apply heat and pressure to the entire surface of the laminate 52 during hot press. For this purpose, hot press is performed with a flat plate-like cushioning material 1 interposed between each heating platen 51 and the laminate 52. A mirror plate 53 is interposed between the laminate 52 and each cushioning material 1.

General characteristics required for the cushioning material 1 include: cushioning properties that absorb irregularities on the heating platen 51 and the laminate 52; in-plane uniformity for uniformly transferring heat and pressure from the heating platen 51 to the entire press surface of the laminate 52; heat transfer properties for efficiently transferring heat from the heating platen 51 to the laminate 52; and heat resistance high enough to withstand the press temperature.

A hot press cushioning material typically includes a cushioning material body that is in the form of a plate and that contains fibers, and surface layers located at the top and bottom surfaces of the cushioning material body. Such a technique is disclosed in Patent Literature 1 (Japanese Unexamined Patent Publication No. 2014-87999). Patent Literature 1 discloses that the surface layers are provided in order to give mainly releasability to the hot press cushioning material, and a synthetic resin film, a releasable resin coating film, etc. is used as a material of the surface layers.

Patent Literature 2 (Japanese Unexamined Patent Publication No. 2004-344962) and Patent Literature 3 (Japanese Unexamined Patent Publication No. 2011-116034) disclose a surface layer material for a hot press cushioning material. Patent Literature 2 discloses a surface layer material including a sheet-like cushioning material body and a releasable coating film formed on the cushioning material body. Specifically, a base material of the surface layer material is glass cloth. Patent Literature 3 discloses a surface layer material that includes a resin layer covering one surface of the surface layer material, a rubber layer covering the other surface of the surface layer material, and a woven fabric layer composed of bulked yarn and disposed between the resin layer and the rubber layer. The resin layer side of the woven fabric layer is a woven fabric-resin composite layer formed by impregnating a part of woven fabric with resin of the resin layer. The rubber layer side of the woven fabric layer is a woven fabric-rubber composite layer formed by impregnating a part of the woven fabric with rubber of the rubber layer. The woven fabric layer has internal voids.

There are also cases where woven fabric made of aramid fibers or paper is used as a surface layer material.

CITATION LIST

Patent Literatures

Patent Literature 1: Japanese Unexamined Patent Publication No. 2014-87999
Patent Literature 2: Japanese Unexamined Patent Publication No. 2004-344962
Patent Literature 3: Japanese Unexamined Patent Publication No. 2011-116034

SUMMARY OF INVENTION

Technical Problem

The conventional surface layers have the following problems. Contact with or impact from a jig during handling or repeated use sometimes causes fuzzing on the surface of the surface layer or damage to a part of the surface layer. In the case where a synthetic resin film is used as a surface layer material, the cushioning material closely contacts the heating platen and the mirror plate due to high surface smoothness of the surface layer, and work efficiency is reduced.

The present invention was made to solve the above problems, and it is an object of the present invention to provide a hot press cushioning material and a method for manufacturing a hot press cushioning material which can prevent fuzzing of and damage to a surface material and which can also prevent close contact of the hot press cushioning material with a heating platen and a mirror plate.

Solution to Problem

A hot press cushioning material according to the present invention includes: a cushioning material body in a form of a plate; and surface materials provided on front and back sides of the cushioning material body. The surface material includes a core layer composed of a heat resistant fiber material for a nonwoven structure, and a front-side resin layer covering an entire front side of the core layer. The core layer has an air permeability of 5 $cm^3 \cdot cm^{-2} \cdot s^{-1}$ or less and a bulk density of 0.8 $g/cm^3$ or more.

Preferably, the core layer is composed of organic fibers.

If the front-side resin layer is too thick, the front-side resin layer will closely contact a product to be pressed, and work efficiency is reduced. Moreover, if the front-side resin layer is too thick, the front-side resin layer may break and fall off.

That is, it is preferable that the front-side resin layer be thin enough to have surface irregularities corresponding to irregularities of fibers of the heat resistant fiber material.

Preferably, the surface material further includes a back-side rubber layer covering an entire back side of the core layer, and the cushioning material body and the surface material are bonded together with the back-side rubber layer interposed therebetween.

Preferably, the front-side resin layer contains at least one resin selected from the group consisting of fluororesin, polyimide resin, polyamide resin, PTFE, and PEEK.

Preferably, the front-side resin layer contains a conductive filler.

A method for manufacturing a hot press cushioning material according to the present invention is a method for manufacturing a hot press cushioning material including a cushioning material body in a form of a plate and surface materials provided on front and back sides of the cushioning material body. A process of manufacturing the surface material includes the steps of subjecting a core layer composed of a heat resistant fiber material for a nonwoven structure to a heating and pressing process so that the core layer has an air permeability of 5 $cm^3 \cdot cm^{-2} \cdot s^{-1}$ or less and a bulk density of 0.8 $g/cm^3$ or more, and covering an entire front side of the core layer with a front-side resin layer that is thin enough to have surface irregularities corresponding to irregularities of fibers of the heat resistant fiber material for the core layer. A process of manufacturing the hot press cushioning material includes the step of bonding the surface materials manufactured in the above process to the cushioning material body.

Preferably, the heating and pressing process for the surface material is calendering or hot press.

Advantageous Effects of Invention

The hot press cushioning material and the method for manufacturing a hot press cushioning material according to the present invention can prevent fuzzing of and damage to a surface material and can also prevent close contact of the hot press cushioning material with a heating platen and a mirror plate.

BRIEF DESCRIPTION OF DRAWINGS

FIG. 16 illustrates a hot press process.

DESCRIPTION OF EMBODIMENTS

Figure 1:
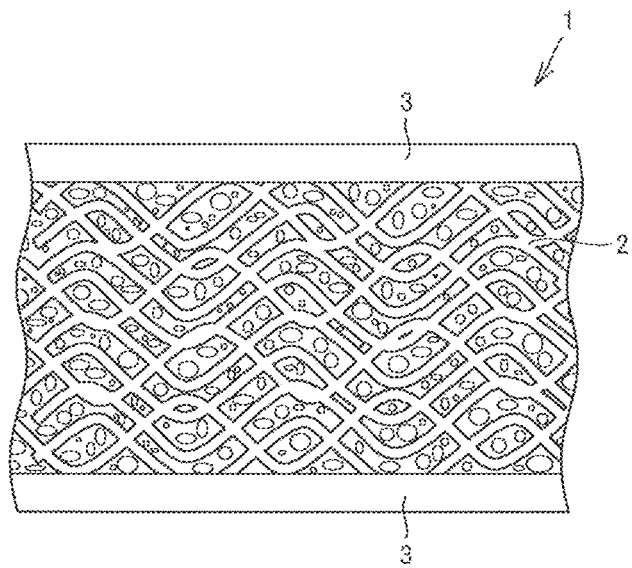
FIG. 1 is an illustrative section of a hot press cushioning material according to an embodiment of the present invention.

An embodiment of the present invention will be described in detail with reference to the accompanying drawings. The same or corresponding parts in the drawings are denoted by the same reference signs, and description thereof will not be repeated.

Hereinafter, an embodiment of the present invention will be described.

FIG. 1 illustrates a hot press cushioning material 1 according to an embodiment of the present invention. As shown in FIG. 1, the hot press cushioning material 1 includes a cushioning material body 2 in the form of a plate, and surface materials 3 provided on the front and back sides of the cushioning material body 2.

For example, the cushioning material body 2 is a fiber-rubber composite material layer composed of woven fabric and rubber with which the woven fabric has been impregnated. Bulked yarn composed of glass fibers is used as either or both of the warp and weft of the woven fabric.

This fiber-rubber composite material layer has internal voids. The fiber-rubber composite material layer has a thickness of about 0.5 mm to 5 mm and is in the form of a sheet.

Preferably, the woven fabric is impregnated with the rubber to fill holes in the entire woven fabric so that the volume ratio of the rubber to the fibers forming the woven fabric is 5 to 50%. The volume ratio of the rubber is more preferably 5 to 35%. The holes in the woven fabric are not completely closed by the rubber and the fiber-rubber composite material layer has a certain level of void properties. The void fraction of the fiber-rubber composite material layer is preferably 20 to 65%, more preferably 25 to 65%.

In the case where the cushioning material body 2 is the woven fabric-rubber composite material layer, the rubber with which the woven fabric is impregnated is preferably one or more materials selected from the group consisting of fluororubber, EPM, EPDM, hydrogenated nitrile rubber, silicone rubber, acrylic rubber, and butyl rubber. The cushioning material body 2 need not necessarily be the woven fabric-rubber composite material layer, and may have a structure that is conventionally used as a cushioning material body. That is, the cushioning material body 2 may have any of the following structures: a single-layer structure of woven fabric, nonwoven fabric, rubber, synthetic resin, or a composite of two or more selected from woven fabric, nonwoven fabric, rubber, and synthetic resin; and a multilayer structure composed of either layers of the same material or layers of different materials selected from woven fabric, nonwoven fabric, rubber, synthetic resin, and a composite of two or more selected from woven fabric, nonwoven fabric, rubber, and synthetic resin.

Figure 2:
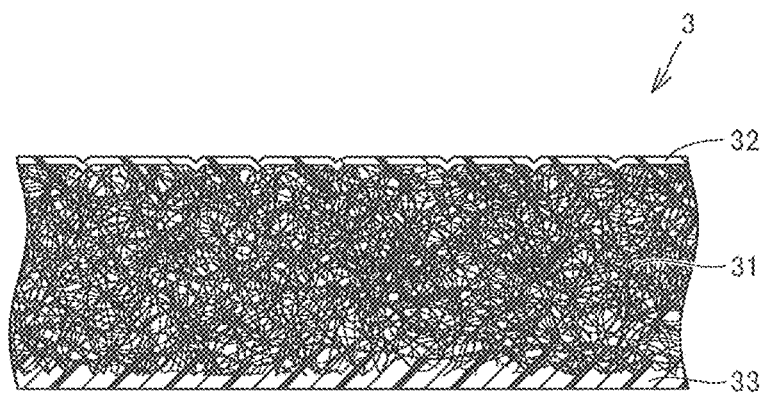
FIG. 2 is an illustrative section of a surface material.

FIG. 2 illustrates the surface material 3. The surface material 3 is provided in order to give mainly releasability to the hot press cushioning material 1. As shown in FIG. 2, the surface material 3 includes a core layer 31, a front-side resin layer 32 covering the entire front side of the core layer 31, and a back-side rubber layer 33 covering the entire back side of the core layer 31.

The core layer 31 is composed of a heat resistant fiber material for a nonwoven structure. As used herein, the term "nonwoven structure" includes woven fabric and paper. Specifically, the core layer 31 is composed of organic fibers. For example, the organic fibers may be fibers made of a material such as polypropylene, polyester, polyamide, polyvinyl alcohol (Vinylon), or aromatic polyamide (aramid).

The core layer 31 is formed by subjecting a heat resistant fiber material for a nonwoven structure to a heating and pressing process. The heating and pressing process refers to pressing while heating, and specifically refers to calendering or hot press. Calendering is a process in which a fiber material for a nonwoven structure is passed through a nip between a heated roll heated to, e.g., 200° C. or higher and a resin roll, and which can control the thickness, smoothness etc. of the resultant nonwoven structure by heating temperature and nip pressure. Hot press is a process of pressing while heating, e.g., at 200° C. or higher.

The core layer 31 can have an air permeability of 5 $cm^3 \cdot cm^{-2} \cdot s^{-1}$ or less and a bulk density of 0.8 $g/cm^3$ or more as a result of the heating and pressing process. If the core layer 31 has an air permeability of more than 5 $cm^3 \cdot cm^{-2} \cdot s^{-1}$ and a bulk density of less than 0.8 $g/cm^3$, fuzzing of the core layer 31 cannot be prevented because the resin applied to the front side of the core layer 31 has penetrated into the core layer 31 and not the entire front side of the core layer 31 can be covered with the front-side resin layer 32. Fuzz of the core layer 31 is flattened in a planar direction by the heating and pressing process.

The front-side resin layer 32 is thin enough to have surface irregularities corresponding to irregularities of fibers of the core layer 31. Specifically, the thickness of the front-side resin layer 32 is 0.5 μm to 200 μm, preferably 1 μm to 50 μm. Since the front-side resin layer 32 has surface irregularities corresponding to irregularities of fibers of the core layer 31, the hot press cushioning material 1 will not closely contact the heating platen 51 and the mirror plate 53. If the front-side resin layer 32 is too thin, the front-side resin layer 32 cannot sufficiently cover the fibers, and therefore fuzzing may occur. Even when the front-side resin layer 32 contains a conductive filler, static electricity may be generated. If the front-side resin layer 32 is too thick, the front-side resin layer 32 do not have surface irregularities corresponding to irregularities of fibers of the core layer 31. Accordingly, the front-side resin layer 32 will closely contact the heating platen 51 and the mirror plate 53, and work efficiency is reduced. The front-side resin layer 32 has penetrated into the front surface portion of the core layer 31 and has entered voids between the fibers.

For example, the front-side resin layer 32 contains at least one resin selected from the group consisting of fluororesin, polyimide resin, polyamide resin, PTFE, and PEEK. It is preferable that the front-side resin layer 32 contain a conductive filler. Examples of the conductive filler include conductive zinc oxide, conductive titanium oxide, carbon black, carbon resin, and carbon nanotubes. Mixing the conductive filler with the front-side resin layer 32 reduces static electricity.

The back-side rubber layer 33 serves to bond the cushioning material body 2 and the surface material 3. For example, the back-side rubber layer 33 is a fluororubber adhesive. The rubber is one rubber or a mixture of two or more rubbers selected from the group consisting of fluororubber, EPM, EPDM, hydrogenated nitrile rubber, silicone rubber, acrylic rubber, and butyl rubber. The back-side rubber layer 33 has penetrated into the back surface portion of the core layer 31 and has entered voids between the fibers.

Next, a method for manufacturing a hot press cushioning material according to the present embodiment will be described with reference to FIGS. 3 and 4.

First, the cushioning material body 2 in the form of a plate is prepared (step S1). In the case where a fiber-rubber composite material layer is used as the cushioning material body 2, woven fabric is impregnated with a rubber solution and is dried to remove the solution in this step (step S1). A process of vulcanizing the rubber in the rubber-impregnated woven fabric can be performed at this stage. Instead of being performed at this stage, this vulcanization process may alternatively be performed in step S3 that will be described later.

Next, surface materials 3 to be provided on the front and back sides of the cushioning material body 2 are prepared (step S2). In this step (step S2), a heat resistant fiber material for a nonwoven structure that will become the core layer 31, a resin that will become the front-side resin layer 32, and an adhesive that will become the back-side rubber layer 33 are prepared in order to produce the surface material 3 shown in FIG. 2.

Figure 4:
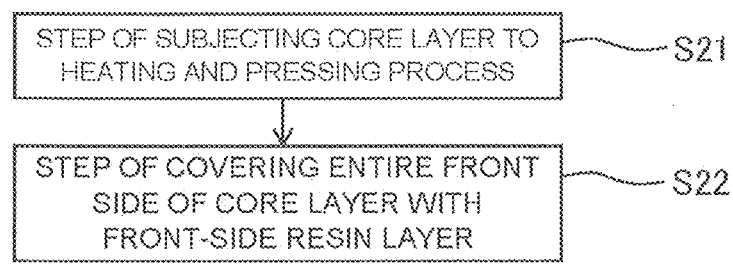
FIG. 4 is a flowchart of a method for manufacturing a surface material.

As shown in FIG. 4, the core layer 31 prepared is subjected to the heating and pressing process (step S21). Specifically, fibers of the heat resistant fiber material for the core layer 31 are subjected to calendering or hot press. As a result, the core layer 31 has an air permeability of 5 $cm^3 \cdot cm^{-2} \cdot s^{-1}$ or less and a bulk density of 0.8 $g/cm^3$ or more.

Subsequently, the entire front side of the core layer 31 is covered with the front-side resin layer 32 (step S22). Specifically, the front-side resin layer 32 is formed by applying the resin to the entire front side of the core layer 31 to a thickness small enough that the front-side resin layer 32 has surface irregularities corresponding to irregularities of fibers of the core layer 31. The adhesive that will become the back-side rubber layer 33 is applied to the entire back side of the core layer 31.

Figure 3:
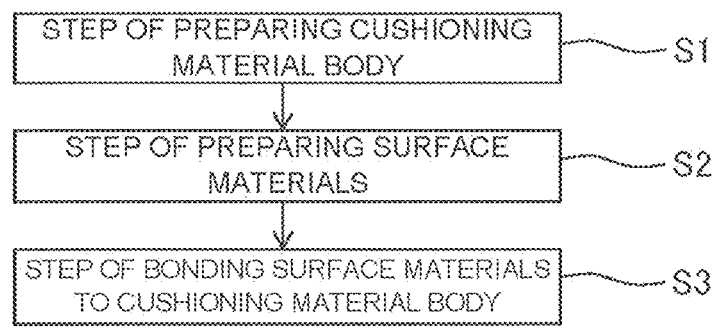
FIG. 3 is a flowchart of a method for manufacturing a hot press cushioning material according to an embodiment of the present invention.

Lastly, as shown in FIG. 3, the surface materials 3 are bonded to the front and back sides of the cushioning material body 2 (step S3). Specifically, the cushioning material body 2 and the surface materials 3 are stacked such that the back-side rubber layers 33 of the surface materials 3 contact the cushioning material body 2. The stack is then subjected to the heating and pressing process to vulcanize the back-side rubber layers 33 and to bond the cushioning material body 2 and the surface materials 3 together. In the case where the process of vulcanizing the rubber in the cushioning material body 2 is not performed in step S1, the rubber in the cushioning material body 2 can be vulcanized simultaneously with the back-side rubber layers 33 by the heating and pressing process that is performed to bond the cushioning material body 2 and the surface materials 3 together.

According to the hot press cushioning material and its manufacturing method of the embodiment, the core layer 31 has an air permeability of 5 cm³·cm⁻²·s⁻¹ or less and a bulk density of 0.8 g/cm³ or more as a result of the step of subjecting the core layer 31 to the heating and pressing process (step S21), and fuzzing of the surface material 3 can be prevented by the step of covering the entire front side of the core layer 31 with the front-side resin layer 32. Since the front-side resin layer 32 is thin enough to have surface irregularities corresponding to irregularities of fibers of the heat resistant fiber material for the core layer 31, the hot press cushioning material 1 will not closely contact the heating platen 51 and the mirror plate 53, and work efficiency is improved.

EXAMPLES

The present invention will be described in more detail using examples. The present invention is not limited to these examples.

Table 1 shows the evaluation results of experiments conducted for Examples 1 and 2 of the present invention and Comparative Examples 1 to 5.

First, a cushioning material body was prepared (step S1). The cushioning material body used was glass woven fabric using bulked yarn, "T860" (manufactured by UNITIKA LTD.). The weft of the woven fabric was bulked yarn produced by bulking twisted yarn of count 305 tex composed of 3,200 E-glass fibers (fiber diameter: 6 μm), and the warp of the woven fabric was unbulked twisted yarn of count 135 tex composed of 1,600 E-glass fibers (fiber diameter: 6 μm). The woven fabric was double weave fabric. The woven fabric had a weight of 850 g/m², a thickness of 1.02 mm, and a void fraction of 67%. An unvulcanized fluororubber solution was also prepared by dissolving unvulcanized fluororubber at a predetermined concentration in a solvent of butyl acetate and methyl ketone mixed at a mass ratio of 1:1. The glass woven fabric was immersed in the unvulcanized fluororubber solution and was then squeezed by two rolls. Thereafter, the resultant glass woven fabric was sufficiently dried to remove the solvent of the unvulcanized fluororubber solution. Two of the cushioning material bodies were produced in this manner.

Next, a surface material was prepared (step S2). Specifically, a core layer used was aramid paper "Nomex Paper Type 410 (5 mil)" (made by DuPont Teijin Advanced Papers Limited.) calendered in the manufacturing process. Polyimide resin varnish containing conductive titanium oxide was applied as a front-side resin layer to the front side of the core layer to a thickness small enough that the front-side resin layer had surface irregularities corresponding to irregularities of fibers of the core layer. The front-side resin layer composed of polyimide resin was thus formed. The thickness of the front-side resin layer was 1 to 10 μm. Subsequently, the unvulcanized fluororubber solution was applied to the back side of the core layer and dried to form a back-side rubber layer serving as an adhesive layer. Two of the surface materials were formed in this manner. The above two cushioning material bodies were stacked with an adhesive material interposed therebetween, and the surface materials were further stacked on the front and back sides of the stack of the two cushioning material bodies such that the back-side rubber layers contact the cushioning material bodies. The stack thus obtained was hot pressed to vulcanize the unvulcanized fluororubber in the cushioning material bodies and the unvulcanized fluororubber on the back sides of the surface materials and to bond the entire stack together. The cushioning material thus obtained was used as Example 1 of the present invention.

Methods for manufacturing a cushioning material of Example 2 of the present invention and Comparative Examples 1 to 5 that will be described below are basically similar to the method for manufacturing a cushioning material of Example 1 of the present invention, but the configuration of the surface materials is different from Example 1 of the present invention as shown in Table 1 below.

Example 2 of the present invention was a cushioning material using hot-pressed polyphenylene sulfide (PPS) paper "PPS paper" (made by HIROSE PAPER MFG CO., LTD.) as core layers of surface materials.

Comparative Example 1 was a cushioning material having no front-side resin layer.

Figure 5:
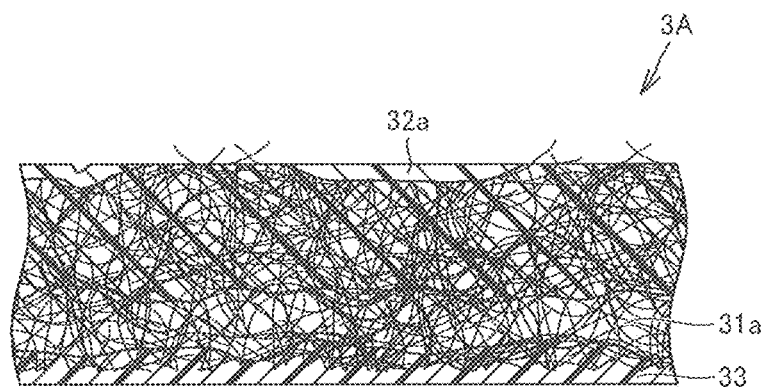
FIG. 5 is an illustrative section of a surface material of Comparative Example 2.

Comparative Example 2 was a cushioning material using non-hot-pressed polyphenylene sulfide (PPS) paper "PPS paper" (made by HIROSE PAPER MFG CO., LTD.) as core layers of surface materials. FIG. 5 is an illustrative section of a surface material 3A of Comparative Example 2. The surface material 3A of Comparative Example 2 had a higher air permeability and a lower bulk density than Example 1 of the present invention because a core layer 31a was not hot pressed. Accordingly, a resin serving as a front-side resin layer 32a penetrated deeper into the core layer 31a, and the front-side resin layer 32a was not able to completely cover the front side of the core layer 31a. Therefore, the surface material 3A had fuzz on its front side.

Figure 6:
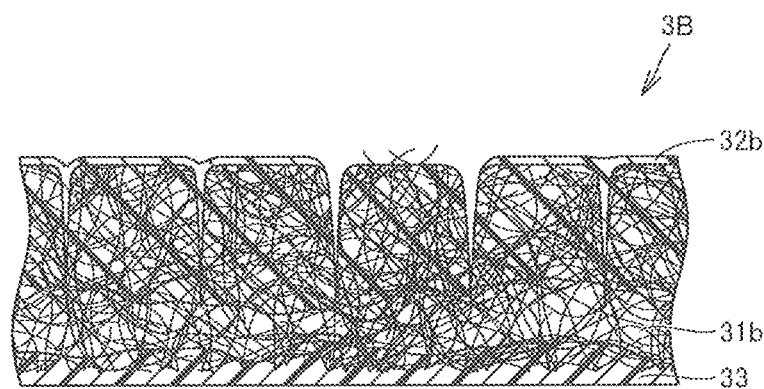
FIG. 6 is an illustrative section of a surface material of Comparative Example 3.

Comparative Example 3 was a cushioning material using hot-pressed needle-punched nonwoven fabric of aramid fibers ("Teijinconex" made by TEIJIN LIMITED.) as core layers of surface materials. FIG. 6 is an illustrative section of a surface material 3B of Comparative Example 3. The surface material 3B of Comparative Example 3 had a higher air permeability and a lower bulk density than Example 1 of the present invention although a core layer 31b was hot pressed. Accordingly, a resin serving as a front-side resin layer 32b penetrated deeper into the core layer 31b, and the front-side resin layer 32b was not able to completely cover the front side of the core layer 31b. Therefore, the surface material 3B had fuzz on its front side.

Comparative Example 4 was a cushioning material using glass cloth as core layers of surface materials. Comparative Example 4 is disclosed in detail in Japanese Unexamined Patent Application Publication No. 2004-344962 (Patent Literature 2).

Comparative Example 5 was a cushioning material whose front-side resin layers had a thickness of 300 μm. The front-side resin layers of Comparative Example 5 completely covered irregularities of fibers of the core layers.

(Evaluation Method)

The surface condition was checked and a press compression test and an impact test were conducted for Examples 1 and 2 of the present invention and Comparative Examples 1 to 5.

Checking of surface condition: The surface condition was visually inspected.

Press compression test: A mirror plate made of a SUS plate and a cushioning material were stacked on top of each other. With a press machine, the stack pressed with 4 MPa in the thickness direction was heated at 230° C. for 60 minutes and then cooled for 10 minutes. The pressure on the stack was then released. It was checked whether the cushioning material was in close contact with the mirror plate when the pressure was released.

Figure 7:
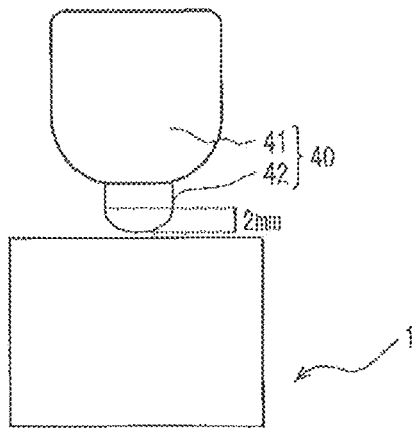
FIG. 7 schematically illustrates a test jig.

Impact test: As shown in FIG. 7, a hammer 40 was used which was composed of a jig 41 for a pressing tester and a spherical terminal 42 attached to the jig 41. The spherical terminal 42 was made of SUS and had a diameter of 10 mm and a height of 2 mm. A test in which an impact load of 5 kgf was applied by hitting the outer end face of the cushioning material with the hammer 40 at a speed of 300 mm/min was repeated 10 times.

The surface condition was checked and the press compression test and the impact test were conducted under the above conditions for the cushioning materials of Examples 1 and 2 of the present invention and Comparative Examples 1 to 5. The results are shown in Table 1.

Regarding the surface condition in Table 1, "○" indicates that surface irregularities were observed or that no fuzz was observed, and "x" indicates that no surface irregularities were observed or that fuzz was observed. Regarding the press compression test in Table 1, "○" indicates that static electricity was not generated or that the cushioning material did not closely contact the mirror plate, and "x" indicates that static electricity was generated or that the cushioning material closely contacted the mirror plate. Regarding the impact test in Table 1, "○" indicates that neither fuzzing nor damage was caused and "x" indicates that either or both of fuzzing and damage were caused.

10(b)), there were surface irregularities and no fuzz was observed on the surface. The surface condition of Example 2 of the present invention (FIG. 9(b)) was similar to that of Example 1 of the present invention.

On the other hand, in Comparative Example 1 (FIGS. 9(c) and 11(a)), there were surface irregularities but fuzz was observed on the surface. This is because Comparative Example 1 had no front-side resin layer.

In Comparative Example 2 (FIGS. 5 and 9(d)), there were surface irregularities on the surface but fuzz was observed on the surface. This is because of the following reason. The core layer of Comparative Example 2 was not hot pressed and therefore had a higher air permeability and a lower bulk density than Example 2 of the present invention. Accordingly, in Comparative Example 2, the front side of the core layer was not able to be sufficiently covered with the front-side resin layer, resulting in fuzzing of the core layer.

In Comparative Example 3 (FIGS. 6, 9(e), and 11(b)), there were surface irregularities but fuzz was observed on the surface. This is because of the following reason. The core layer of Comparative Example 3 was hot pressed but had a high air permeability and a low bulk density. Accordingly, in Comparative Example 3, the front side of the core layer was not able to be sufficiently covered with the front-side resin layer.

TABLE 1

| | Configuration of Surface Material | | | | Press Compression Test | | |
|---|---|---|---|---|---|---|---|
| | Front-Side Resin Layer | Core Layer | Processing for Core Layer | Surface Condition | | Static Electricity | Close Contact | Impact Test |
| | | | | Irregularities | Fuzz | | | |
| Example 1 of Present Invention | Polyimide Resin | Aramid Paper | Calendering | ○ | ○ | ○ | ○ | ○ |
| Example 2 of Present Invention | Polyimide Resin | PPS Paper | Hot Press | ○ | ○ | ○ | ○ | ○ |
| Comparative Example 1 | — | Aramid Paper | Calendering | ○ | x | x | x | x |
| Comparative Example 2 | Polyimide Resin | PPS Paper | — | ○ | x | ○ | ○ | x |
| Comparative Example 3 | Polyimide Resin | Aramid Nonwoven Fabric | Hot Press | ○ | x | ○ | ○ | x |
| Comparative Example 4 | Polyimide Resin | Glass Cloth | — | ○ | ○ | ○ | ○ | x |
| Comparative Example 5 | Polyimide Resin (Large Amount) | Aramid Paper | Calendering | x | ○ | ○ | x | ○ |

Figure 8:
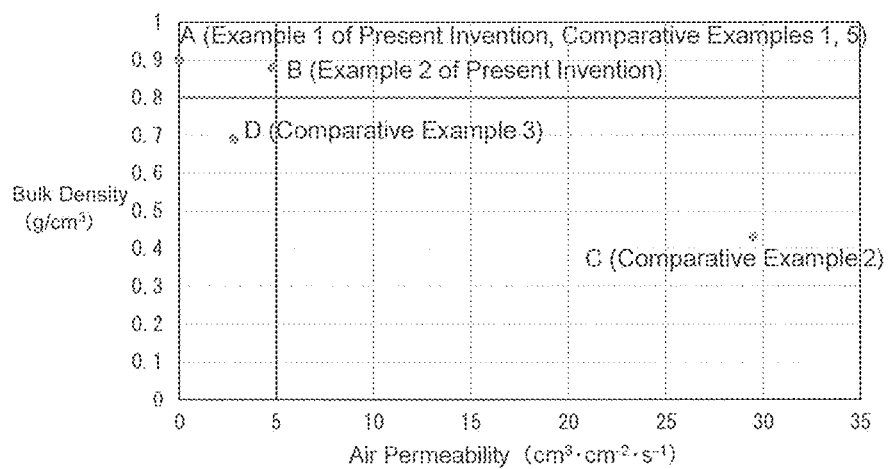
FIG. 8 is a graph showing the relationship between air permeability and bulk density.

FIG. 8 is a graph indicating the air permeability and bulk density of the core layers used in Examples 1 and 2 of the present invention and Comparative Examples 1 to 3 and 5. In FIG. 8, A indicates the calendered aramid paper used in Example 1 of the present invention and Comparative Examples 1 and 5, and the air permeability was 0 $cm^3 \cdot cm^{-2} \cdot s^{-1}$ and the bulk density was 0.9 $g/cm^3$. In FIG. 8, B indicates the hot-pressed PPS paper used in Example 2 of the present invention, and the air permeability was 4.8 $cm^3 \cdot cm^{-2} \cdot s^{-1}$ and the bulk density was 0.88 $g/cm^3$. In FIG. 8, C indicates the non-hot-pressed PPS paper used in Comparative Example 2, and the air permeability was 29.5 $cm^3 \cdot cm^{-2} \cdot s^{-1}$ and the bulk density was 0.43 $g/cm^3$. In FIG. 8, D indicates the hot-pressed aramid nonwoven fabric used in Comparative Example 3, and the air permeability was 2.8 $cm^3 \cdot cm^{-2} \cdot s^{-1}$ and the bulk density was 0.68 $g/cm^3$.

(Evaluation Results)

Figure 9:
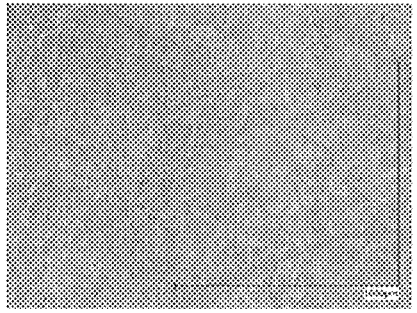
FIG. 9 shows images of a surface of a cushioning material, where FIG. 9($a$) is an image of Example 1 of the present invention, FIG. 9($b$) is an image of Example 2 of the present invention, FIG. 9($c$) is an image of Comparative Example 1, FIG. 9($d$) is an image of Comparative Example 2, FIG. 9($e$) is an image of Comparative Example 3, FIG. 9($f$) is an image of Comparative Example 4, and FIG. 9($g$) is an image of Comparative Example 5.
Figure 9:
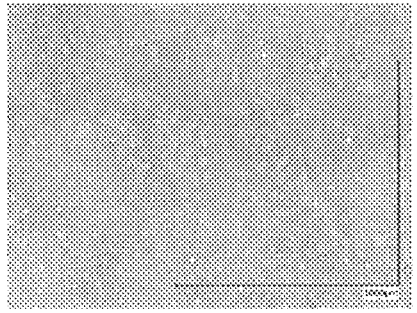
Figure 9:
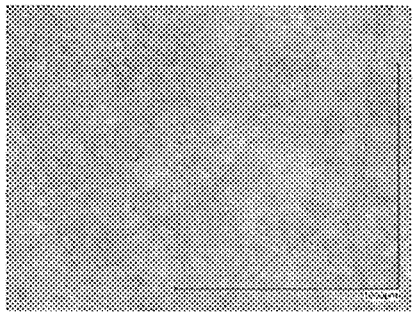
Figure 9:
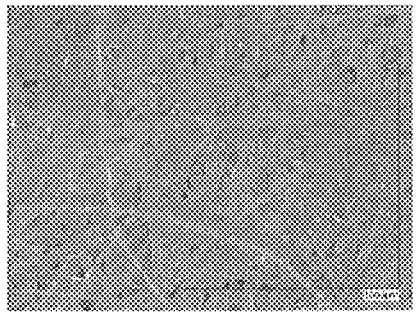
Figure 9:
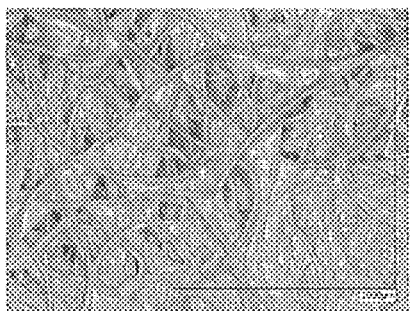
Figure 9:
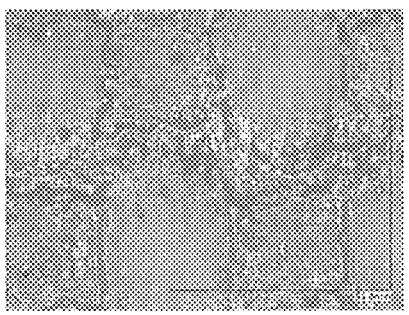
Figure 9:
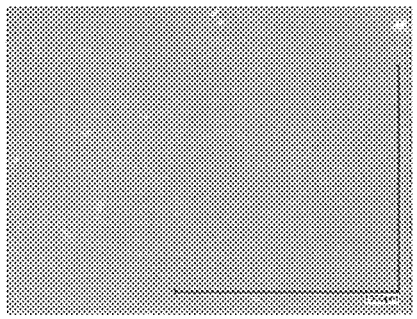
Figure 10:
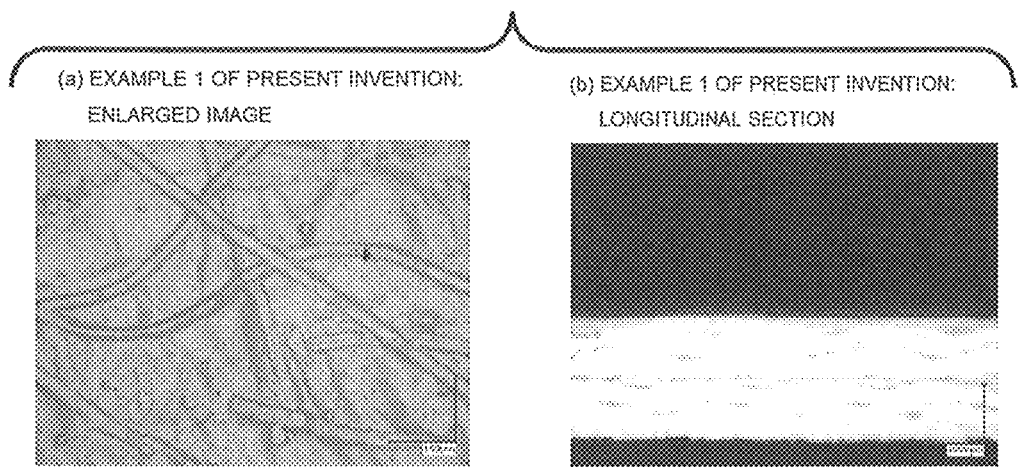
FIG. 10 shows images of Example 1 of the present invention, FIG. 10($a$) is an enlarged image of FIG. 9($a$), and FIG. 10($b$) is an image of a longitudinal section of the cushioning material.
Figure 11:
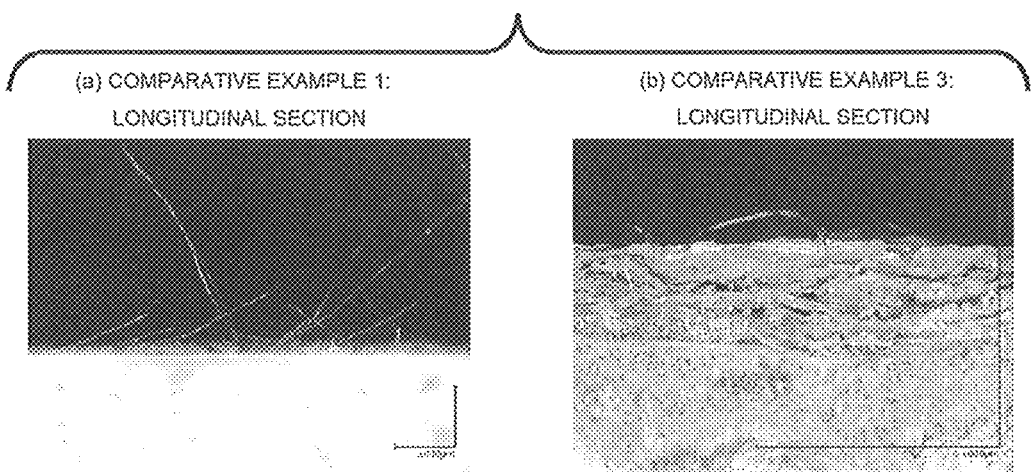
FIG. 11 shows images of a part of a longitudinal section including a surface portion of a cushioning material, where FIG. 11($a$) is an image of Comparative Example 1, and FIG. 11($b$) is an image of Comparative Example 3.
Figure 12:
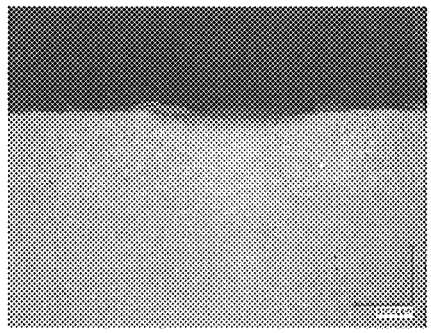
FIG. 12 shows images of a surface of a cushioning material after an impact test, where FIG. 12($a$) is an image of Example 1 of the present invention, FIG. 12($b$) is an image of Example 2 of the present invention, FIG. 12($c$) is an image of Comparative Example 1, FIG. 12($d$) is an image of Comparative Example 2, FIG. 12($e$) is an image of Comparative Example 3, FIG. 12($f$) is an image of Comparative Example 4, and FIG. 12($g$) is an image of Comparative Example 5.
Figure 12:
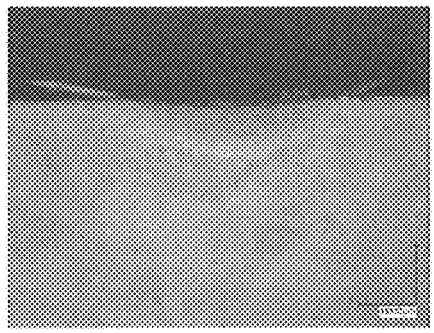
Figure 12:
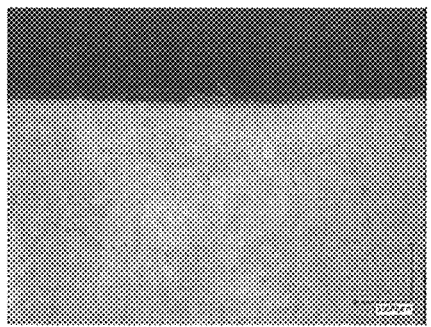
Figure 12:
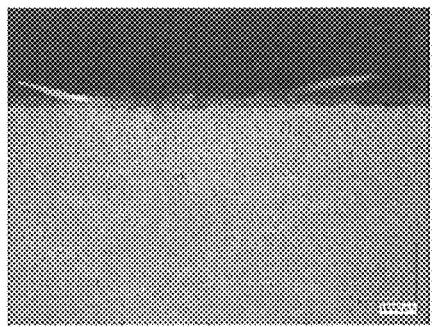
Figure 12:
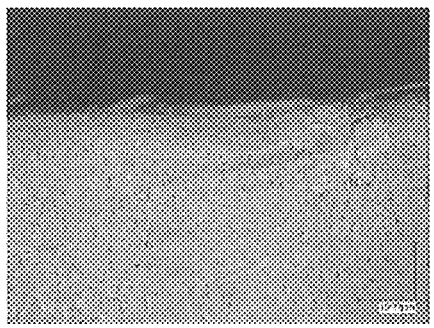
Figure 12:
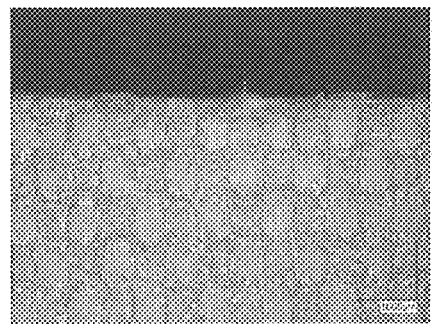
Figure 12:
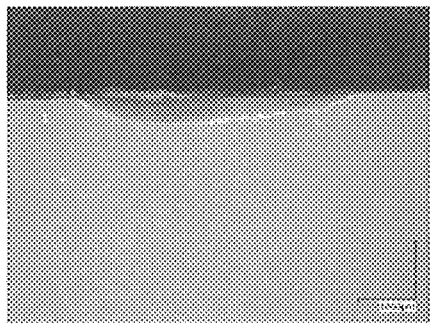

FIGS. 9 to 11 show images of the surface conditions of Examples 1 and 2 of the present invention and Comparative Examples 1 to 5. Regarding the surface condition, in Example 1 of the present invention (FIGS. 9(a), 10(a), and In Comparative Example 4 (FIG. 9(f)), there were surface irregularities and no fuzz was observed on the surface. In Comparative Example 5 (FIG. 9(g)), there were no surface irregularities and no fuzz was observed on the surface. This is because a large amount of resin was applied as the front-side resin layer so as to completely cover irregularities of fibers of the core layer.

Next, regarding the press compression test, as shown in Table 1, static electricity was not generated and the cushioning material did not closely contact the mirror plate in Examples 1 and 2 of the present invention and Comparative Examples 2, 3, and 4. In Comparative Example 1, on the other hand, static electricity was generated, and the cushioning material closely contacted the mirror plate. This is because Comparative Example 1 has no front-side resin layer. In Comparative Example 5, static electricity was not generated, but the cushioning material closely contacted the mirror plate. This is because the front-side resin layer was thick enough to completely cover irregularities of fibers of the core layer.

FIGS. 12 to 15 show images of the surfaces of the cushioning materials of Examples 1 and 2 of the present invention and Comparative Examples 1 to 5 after the impact test.

Figure 13:
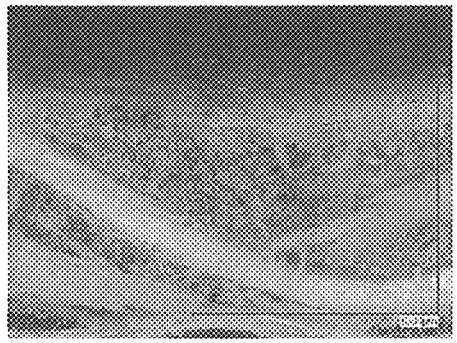
FIG. 13 is an image of a part of a longitudinal section including a surface portion of Example 1 of the present invention after an impact test.
Figure 14:
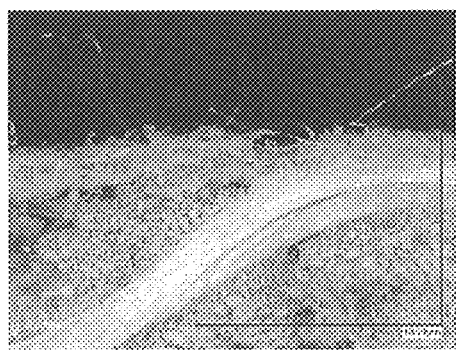
FIG. 14 is an image of a part of a longitudinal section including a surface portion of Comparative Example 2 after an impact test.
Figure 15:
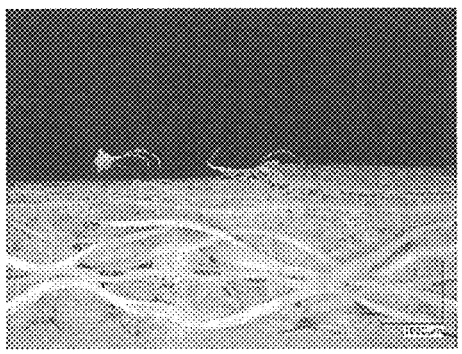
FIG. 15 is an image of a part of a longitudinal section including a surface portion of Comparative Example 3 after an impact test.

In the impact test, Example 1 of the present invention (FIGS. 12(a) and 13) and Example 2 of the present invention (FIG. 12(b)) had no problem. That is, neither fuzzing nor damage was observed on the surface. In Comparative Examples 1 to 4 (FIGS. 12(c) to 12(f)), on the other hand, fiber fraying, fuzz shedding, etc. were observed. Especially in Comparative Example 1 in which the core layer was not covered with the front-side resin layer, and Comparative Example 2 (FIG. 14) and Comparative Example 3 (FIG. 15) in which the front side of the core layer was not able to be completely covered with the front-side resin layer, the surface was damaged when an impact was applied. In Comparative Example 4 (FIG. 12(f)) in which the core layer was glass cloth, the surface material was damaged by an impact.

The impact test results show that the cushioning materials of Examples 1 and 2 of the present invention and Comparative Example 5 are more resistant to impact than the cushioning materials of Comparative Examples 1 to 4.

The results described above show that Examples 1 and 2 of the present invention can prevent fuzzing, do not closely contact a heating platen and a mirror plate, and is resistant to impact.

The embodiment disclosed herein should be construed as illustrative in all respects and not as restrictive. The scope of the present invention is not defined by the above description but by the claims, and is intended to include all modifications that are made without departing from the scope of the claims.

REFERENCE SIGNS LIST

1: Hot Press Cushioning material, 2: Cushioning Material Body, 3, 3A, 3B: Surface Material, 31, 31*a*, 31*b*: Core Layer, 32, 32*a*, 32*b*: Front-Side Resin Layer, 33: Back-Side Rubber Layer, 40: Hammer, 41: Jig for Pressing Tester, 42: Spherical Terminal, 51: Heating Platen, 52: Laminate, 53: Mirror Plate

The invention claimed is:

1. A hot press cushioning material, comprising:
a cushioning material body in a form of a plate; and
surface materials provided on front and back sides of the cushioning material body, wherein
the surface material includes a core layer composed of a heat resistant fiber material for a nonwoven structure, and a front-side resin layer covering an entire front side of the core layer,
the front-side resin layer has a first surface facing the core layer, and a second surface facing away from the core layer, and the second surface of the front-side resin layer has surface irregularities corresponding to irregularities of fibers of the heat resistant fiber material, and
the core layer has an air permeability of 5 $cm^3 \cdot cm^{-2} \cdot s^{-1}$ or less and a bulk density of 0.8 $g/cm^3$ or more.

2. The hot press cushioning material according to claim 1, wherein the core layer is composed of organic fibers.

3. The hot press cushioning material according to claim 1, wherein
the surface material further includes a back-side rubber layer covering an entire back side of the core layer, and
the cushioning material body and the surface material are bonded together with the back-side rubber layer interposed therebetween.

4. The hot press cushioning material according to claim 1, wherein
the front-side resin layer contains at least one resin selected from the group consisting of fluororesin, polyimide resin, polyamide resin, PTFE, and PEEK.

5. The hot press cushioning material according to claim 1, wherein
the front-side resin layer contains a conductive filler.

6. A hot press cushioning material, comprising:
a cushioning material body in a form of a plate; and
surface materials provided on front and back sides of the cushioning material body, wherein
the surface material includes a core layer composed of a heat resistant fiber material for a nonwoven structure, and a front-side resin layer covering an entire front side of the core layer,
the front-side resin layer contains a conductive filler, and
the core layer has an air permeability of 5 $cm^3 \cdot cm^{-2} \cdot s^{-1}$ or less and a bulk density of 0.8 $g/cm^3$ or more.

7. The hot press cushioning material according to claim 6, wherein
the core layer is composed of organic fibers.

8. The hot press cushioning material according to claim 6, wherein
the front-side resin layer is thin enough to have surface irregularities corresponding to irregularities of fibers of the heat resistant fiber material.

9. The hot press cushioning material according to claim 6, wherein
the surface material further includes a back-side rubber layer covering an entire back side of the core layer, and
the cushioning material body and the surface material are bonded together with the back-side rubber layer interposed therebetween.

10. The hot press cushioning material according to claim 6, wherein
the front-side resin layer contains at least one resin selected from the group consisting of fluororesin, polyimide resin, polyamide resin, PTFE, and PEEK.

* * * * *